(12) United States Patent  (10) Patent No.: US 8,462,598 B2
Kato et al.                  (45) Date of Patent: Jun. 11, 2013

(54) INFORMATION PROVIDING SYSTEM, REPRODUCTION DEVICE AND METHOD, INFORMATION PROVIDING DEVICE AND METHOD, RECORDING MEDIUM, AND PROGRAM

(75) Inventors: Motoki Kato, Kanagawa (JP); Toshiya Hamada, Saitama (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/177,955

(22) Filed: Jul. 7, 2011

(65) Prior Publication Data

US 2011/0262107 A1    Oct. 27, 2011

Related U.S. Application Data

(63) Continuation of application No. 10/579,965, filed as application No. PCT/JP2004/014355 on Sep. 30, 2004, now Pat. No. 8,009,530.

(30) Foreign Application Priority Data

Nov. 25, 2003  (JP) ................................. 2003-393242

(51) Int. Cl.
*G11B 15/52*  (2006.01)

(52) U.S. Cl.
USPC ....................................................... 369/47.15

(58) Field of Classification Search
None
See application file for complete search history.

(56) References Cited

U.S. PATENT DOCUMENTS

| 5,644,782 | A  | 7/1997  | Yeates et al. |
| 6,944,621 | B1 | 9/2005  | Collart |
| 6,952,818 | B2 | 10/2005 | Ikeuchi |
| 6,993,567 | B1 | 1/2006  | Yodo et al. |
| 2004/0220791 | A1 | 11/2004 | Lamkin et al. |
| 2004/0255236 | A1 | 12/2004 | Collart |
| 2005/0044481 | A1 | 2/2005 | Collart |
| 2006/0098936 | A1 | 5/2006 | Ikeda et al. |
| 2010/0046923 | A1 | 2/2010 | Ikeda et al. |
| 2010/0046924 | A1 | 2/2010 | Ikeda et al. |

FOREIGN PATENT DOCUMENTS

| EP | 1 030 301 A1 | 8/2000 |
| EP | 1 553 769 A1 | 7/2005 |
| JP | 6-208780 | 7/1994 |
| JP | 11-144322 | 5/1999 |

(Continued)

OTHER PUBLICATIONS

Supplementary Search Report issued Aug. 8, 2011 in Europe Application No. 04788383.0.

(Continued)

*Primary Examiner* — Paul Huber
(74) *Attorney, Agent, or Firm* — Oblon, Spivak, McClelland, Maier & Neustadt, L.L.P.

(57) ABSTRACT

This invention relates to an information providing system, a reproducing apparatus, a reproducing method, an information providing apparatus, an information providing method, a recording medium, and a program. If an instruction is given to download a Japanese language audio file, update files corresponding to the content recorded on an optical disc 11 are downloaded. After being downloaded as the update files, audio stream files in Japanese are recorded to a local storage 12 along with accompanying clip information files, play list files for controlling reproduction of the audio stream files, and an updated navigation program file. The updated navigation program is used illustratively to reproduce a clip 3 audio stream file in Japanese. This invention applies among others to players to which a recording medium that stores contents is removable.

4 Claims, 18 Drawing Sheets

FOREIGN PATENT DOCUMENTS

| | | |
|---|---|---|
| JP | 2000-295578 | 10/2000 |
| JP | 2001-251589 | 9/2001 |
| JP | 2002-49518 | 2/2002 |
| JP | 2002-372910 | 12/2002 |
| JP | 2004-221765 | 8/2004 |
| WO | WO 00/63916 | 10/2000 |

OTHER PUBLICATIONS

European Office Action issued Apr. 16, 2012 in Patent Application No. 04 788 383.0.

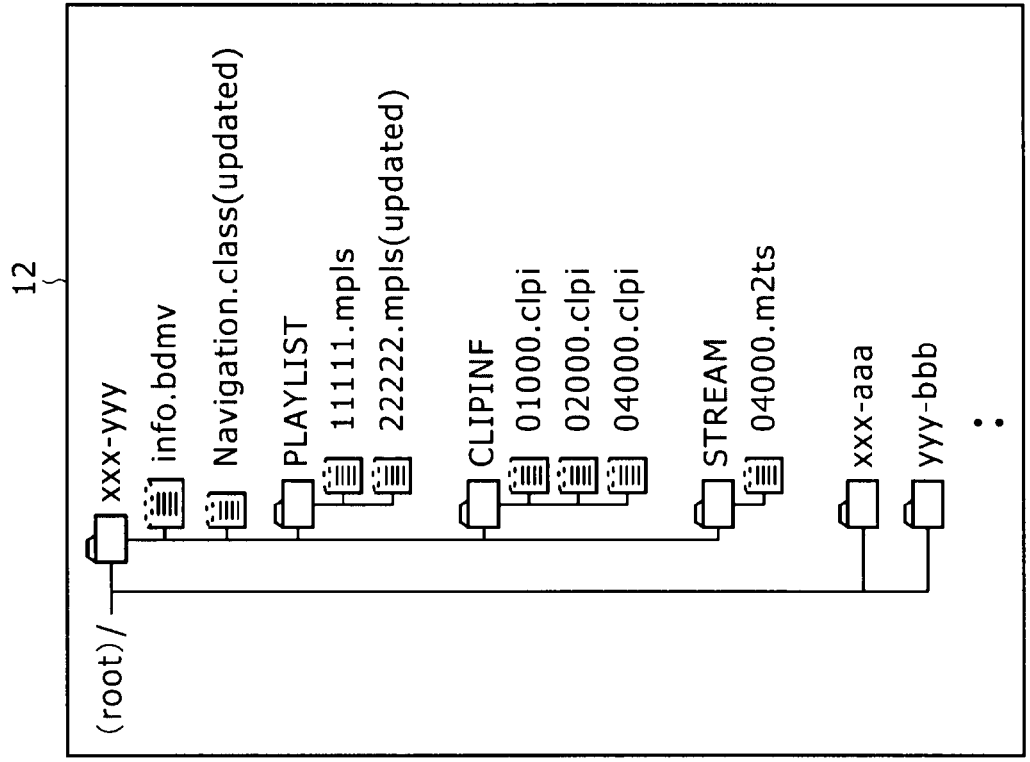
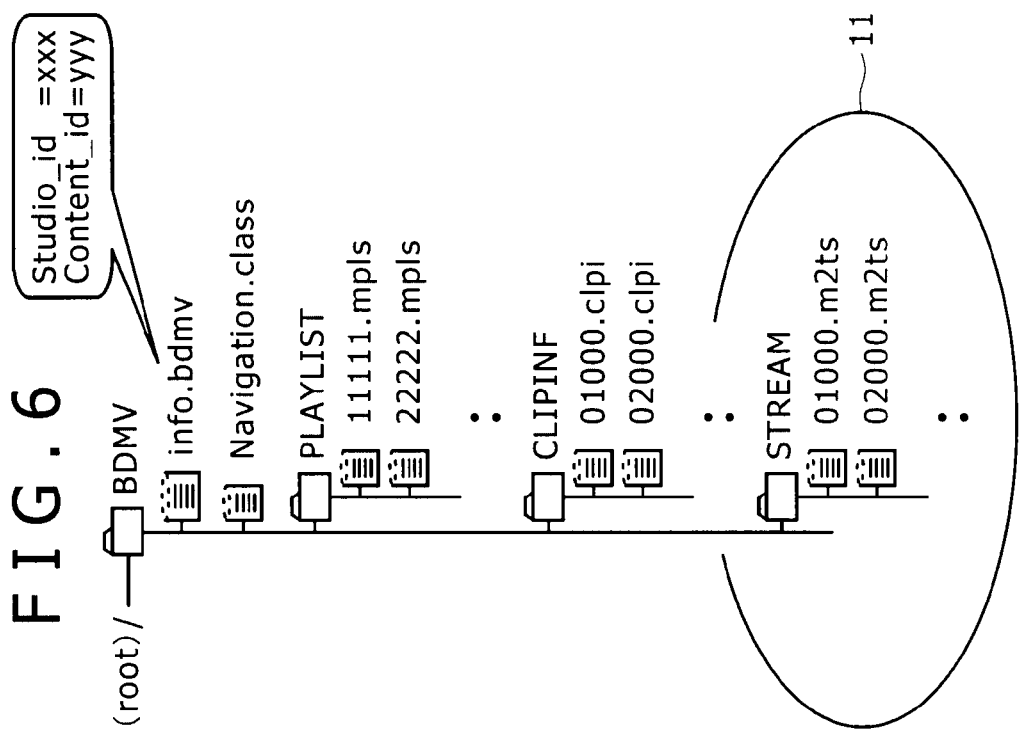
FIG. 6

FIG. 8

| Syntax | No. of bits | Mnemonic |
|---|---|---|
| PlayList(){ | | |
|   length | 32 | uimsbf |
|   reserved_for_word_align | 12 | bslbf |
|   PL_CPI_type | 4 | bslbf |
|   number_of_PlayItems | 16 | uimsbf |
|   if ((Virtual-PlayList) && PL_CPI_type==1){ | | |
|     number_of_SubPlayItems | 16 | uimsbf |
|   }else{ | | |
|     reserved_for_word_align | 16 | bslbf |
|   } | | |
|   for (PlayItem_id=0: | | |
|     PlayItem_id<number_of_PlayItems: | | |
|     PlayItem_id++){ | | |
|     PlayItem() | | |
|   } | | |
|   if ((Virtual-PlayList) && PL_CPI_typ==1){ | | |
|     for (i=0:i < number_of_SubPlayItems:i++){ | | |
|       SubPlayItem() | | |
|     } | | |
|   } | | |
| } | | |

FIG.9

| Syntax | No. of bits | Mnemonic |
|---|---|---|
| PlayItem(){ | | |
|   length | 16 | uimsbf |
|   Clip_Information_file_name | 8*5 | bslbf |
|   Clip_codec_identifier | 8*4 | bslbf |
|   reserved_for_future_use | 12 | bslbf |
|   connection_condition | 4 | uimsbf |
| } | | |

FIG.10

| Syntax | No. of bits | Mnemonic |
|---|---|---|
| SubPlayItem(){ | | |
|    length | 16 | uimsbf |
|    Clip_Information_file_name | 8*5 | bslbf |
|    Clip_codec_identifier | 8*4 | bslbf |
|    reserved_for_future_use | 8 | bslbf |
|    SubPlayItem_type | 8 | bslbf |
|    ref_to_STC_id | 8 | uimsbf |
|    SubPlayItem_IN_time | 32 | uimsbf |
|    SubPlayItem_OUT_time | 32 | uimsbf |
|    sync_PlayItem_id | 16 | uimsbf |
|    sync_start_PTS_of_PlayItem | 32 | uimsbf |
| } | | |

//  # INFORMATION PROVIDING SYSTEM, REPRODUCTION DEVICE AND METHOD, INFORMATION PROVIDING DEVICE AND METHOD, RECORDING MEDIUM, AND PROGRAM

CROSS REFERENCES TO RELATED APPLICATIONS

This application is a continuation of and claims the benefit of priority under 35 U.S.C. §120 from U.S. Ser. No. 10/579, 965, filed May 21, 2007, the entire contents of which are incorporated herein by reference. The U.S. Ser. No. 10/579, 965 is a national stage of PCT Application No. PCT/JP04/14355, filed Sep. 30, 2004, and claims the benefit of priority under 35 U.S.C. §119 from Japanese Patent Application JP2003-393242, filed on Nov. 25, 2003.

TECHNICAL FIELD

The present invention relates to an information providing system, a reproducing apparatus, a reproducing method, an information providing apparatus, an information providing method, a recording medium, and a program. More particularly, the invention relates to an information providing system, a reproducing apparatus, a reproducing method, an information providing apparatus, an information providing method, a recording medium, and a program for downloading update files regarding contents stored on a recording medium.

BACKGROUND ART

The DVD video format is one of the read-only standards set for DVD (digital versatile disc). With the DVD video format in use, content data such as video and audio data and various kinds of sub picture data such as subtitles are multiplexed into program streams that are recorded to a disc. Also recorded to the disc is navigation data for interactively reproducing the recorded program streams.

Interactive reproduction involves allowing the user to reproduce recorded data by making use of diverse DVD functions. These functions include: the basic function of letting the data be reproduced from any desired positions or in any desired order; a multi-angle function whereby images taken from diverse angles are reproduced; a multi-language function whereby the data is reproduced in any one of a plurality of languages; and a parental control function whereby violent or other undesirable scenes are prevented from getting reproduced.

A plurality of audio streams and a plurality of sub picture streams may be multiplexed into a program stream. This feature makes it possible record on a disc a single video content such as a movie together with a plurality of languages as audio and subtitle data. At the start of or during video reproduction, the user is allowed to select a desired language for audio and subtitle output.

Illustratively, Patent Document 1 discloses a system that allows a user easily to download contents such as sound effects and moving or still images used as materials for video works. Patent Document 2 discloses techniques for replacing certain portions of an integral set of music data with other data.

[Patent Document 1]
Japanese Patent Laid-Open No. 2003-140662
[Patent Document 2]
Japanese Patent Laid-Open No. 2002-311967

DISCLOSURE OF THE INVENTION

Problems to be Solved by the Invention

Traditionally, the user has been allowed to reproduce contents only from the disc being set in the user's player. This is an inconvenience which, however, has been taken for granted.

For example, a user who purchased a disc carrying a movie content in the English language alone cannot watch the movie with dialog in, say, Japanese or with Japanese subtitles when that disc is subjected to reproduction.

Disk distributors operating in a plurality of countries whose populations speak different languages need to prepare either discs of the same movie contents with audio and subtitle data in as many different languages for distribution in the countries concerned, or discs each made in a particular language for distribution in a particular country or region. Such preparations take time. In some cases, tardy responses could lead to missed business opportunities.

The present invention has been made in view of the above circumstances and provides arrangements for permitting the downloading of files by which to update the contents recorded on a disc so that a user may make a relatively free use of the contents on the disc based on his or her preferences.

Means for Solving the Problems

In carrying out the present invention and according to one embodiment thereof, there is provided an information providing system having a reproducing apparatus and an information providing apparatus, the reproducing apparatus including: a readout section configured to read from a recording medium identification information about the recording medium which is removable and which stores an AV stream and first control information for controlling reproduction of the AV stream; a recording control section configured to acquire second control information constituting an update of the first control information from the information providing apparatus in accordance with the identification information read out by the readout section, the recording control section further recording the second control information to a recording section; and a reproduction control section configured to control reproduction of the AV stream based on the second control information recorded to the recording section by the recording control section.

The information providing apparatus in the inventive information providing system includes: an acquisition section configured to acquire from a database the second control information to be provided to the reproducing apparatus in accordance with the identification information sent from the reproducing apparatus; and a provision section configured to provide the reproducing apparatus with the second control information acquired by the acquisition section.

According to another embodiment of the present invention, there is provided a reproducing apparatus including: a readout section configured to read from a recording medium identification information about the recording medium which is removable and which stores an AV stream and first control information for controlling reproduction of the AV stream; a recording control section configured to acquire second control information constituting an update of the first control information from an information providing apparatus connected via a network, the acquisition being made in accordance with the identification information read out by the readout section, the recording control section further recording the second control information to a recording section; and a reproduction control section configured to control reproduction of the AV stream based on the second control information recorded to the recording section by the recording control section.

The recording control section may preferably record to a directory of the recording section the second control information and the AV stream of which the reproduction is controlled in accordance with the second control information, the directory being furnished with a name including the identification information.

Preferably, the recording control section may acquire other AV streams along with the second control information from the information providing apparatus and may record what is acquired to the recording section; and the reproduction control section may control reproduction the other AV streams in accordance with the second control information.

The second control information may preferably include information for designating reproduction segments of the AV stream recorded on the recording medium, and information for designating reproduction segments of the other AV streams acquired from the information providing apparatus along with the second control information.

Preferably, the reproducing apparatus according to the present invention may further include an authentication section configured to authenticate the information providing apparatus by querying the information providing apparatus about part of the information recorded on the recording medium.

Preferably, the inventive reproducing apparatus may further include an authentication section configured to authenticate the second control information by querying the information providing apparatus about part of the second control information.

According to a further embodiment of the present invention, there is provided a reproducing method including the steps of: reading from a recording medium identification information about the recording medium which is removable and which stores an AV stream and first control information for controlling reproduction of the AV stream; acquiring second control information constituting an update of the first control information from an information providing apparatus connected via a network, the acquisition being made in accordance with the identification information read out in the reading step, the acquiring step further recording the second control information to a recording section; and controlling reproduction of the AV stream based on the second control information recorded to the recording section in the acquiring step.

According an even further embodiment of the present invention, there is provided a first program for causing a computer to carry out a procedure including the steps of: reading from a recording medium identification information about the recording medium which is removable and which stores an AV stream and first control information for controlling reproduction of the AV stream; acquiring second control information constituting an update of the first control information from an information providing apparatus connected via a network, the acquisition being made in accordance with the identification information read out in the reading step, the acquiring step further recording the second control information to a recording section; and controlling reproduction of the AV stream based on the second control information recorded to the recording section in the acquiring step.

According to a still further embodiment of the present invention, there is provided an information providing apparatus connected via a network to a reproducing apparatus loaded with a recording medium which stores an AV stream and first control information for controlling reproduction of the AV stream, the information providing apparatus including: an acquisition section configured to acquire from a database second control information which constitutes an update of the first control information and which is provided to the reproducing apparatus in accordance with identification information about the recording medium sent from the reproducing apparatus; and a provision section configured to provide the reproducing apparatus with the second control information acquired by the acquisition section.

The acquisition section may preferably acquire other AV streams along with the second control information from the database and the provision section may preferably provide the reproducing apparatus with the other AV streams together with the second control information.

According to a yet further embodiment of the present invention, there is provided an information providing method for use with an information providing apparatus connected via a network to a reproducing apparatus loaded with a recording medium which stores an AV stream and first control information for controlling reproduction of the AV stream, the information providing method including the steps of: acquiring from a database second control information which constitutes an update of the first control information and which is provided to the reproducing apparatus in accordance with identification information about the recording medium sent from the reproducing apparatus; and providing the reproducing apparatus with the second control information acquired in the acquiring step.

According to another embodiment of the present invention, there is provided a second program for causing a computer to carrying out a procedure on an information providing apparatus connected via a network to a reproducing apparatus loaded with a recording medium which stores an AV stream and first control information for controlling reproduction of the AV stream, the procedure including the steps of: acquiring from a database second control information which constitutes an update of the first control information and which is provided to the reproducing apparatus in accordance with identification information about the recording medium sent from the reproducing apparatus; and providing the reproducing apparatus with the second control information acquired in the acquiring step.

According to a further embodiment of the present invention, there is provided a recording medium removable to a reproducing apparatus, the recording medium having information recorded thereon including: an AV stream; first control information for use by the reproducing apparatus in controlling reproduction of the AV stream; and identification information for use by the reproducing apparatus in acquiring second control information constituting an update of the first control information from an information providing apparatus connected via a network to the reproducing apparatus.

Where the reproducing apparatus of the information providing apparatus according to the present invention is in use, identification information is first read from a recording medium which is removable and which stores an AV stream and first control information for controlling reproduction of the AV stream, the identification information identifying the recording medium in question. Second control information constituting an update of the first control information is then acquired from the information providing apparatus in accordance with the identification information that has been read out, the second control information being further recorded to a recording section. Reproduction of the AV stream is controlled based on the second control information recorded to the recording section. With the information providing apparatus of the inventive information providing system in use, the second control information to be provided to the reproducing apparatus is acquired from a database in accordance with the identification information sent from the reproducing apparatus. The reproducing apparatus is then provided with the second control information thus acquired.

Where the reproducing apparatus, reproducing method, and first program according to the present invention are in use, identification information is also read from a recording medium which is removable and which stores an AV stream and first control information for controlling reproduction of the AV stream, the identification information identifying the recording medium in question. Second control information constituting an update of the first control information is then acquired from the information providing apparatus in accordance with the identification information that has been read out, the second control information being further recorded to a recording section. Reproduction of the AV stream is controlled based on the second control information recorded to the recording section.

Where the information providing apparatus, information providing method, and second program according to the present invention are in use, the second control information to be provided to the reproducing apparatus is acquired from the database in accordance with the identification information sent from the reproducing apparatus. The reproducing apparatus is then provided with the second control information thus acquired.

Where the recording medium according to the present invention is in use, the medium has information recorded thereon including: an AV stream; first control information for use by a reproducing apparatus in controlling reproduction of the AV stream; and identification information for use by the reproducing apparatus in acquiring second control information constituting an update of the first control information from an information providing apparatus connected via a network to the reproducing apparatus.

Effects of the Invention

According to the present invention, the user is allowed to download update files corresponding to the content recorded on a recording medium.

Also according to the present invention, the user may make a relatively free use of the contents stored on the recording medium based on his or her preferences.

Furthermore, according to the present invention, the distributor of recording media is allowed to add functions later to each recording medium having been sold. This feature allows the distributor to market recording media each with only a minimum of data recorded thereon. This makes it possible for the distributor to start selling recording media earlier than usual.

BRIEF DESCRIPTION OF DRAWINGS

FIG. 6 is a schematic view showing a file system of an optical disc and a file system of a local storage.

FIG. 8 is tabular view showing a typical syntax of a play list.

FIG. 9 is a tabular view showing a typical syntax of a play item.

FIG. 10 is a tabular view showing a typical syntax of a sub play item.

DESCRIPTION OF REFERENCE NUMERALS

Figure 1:
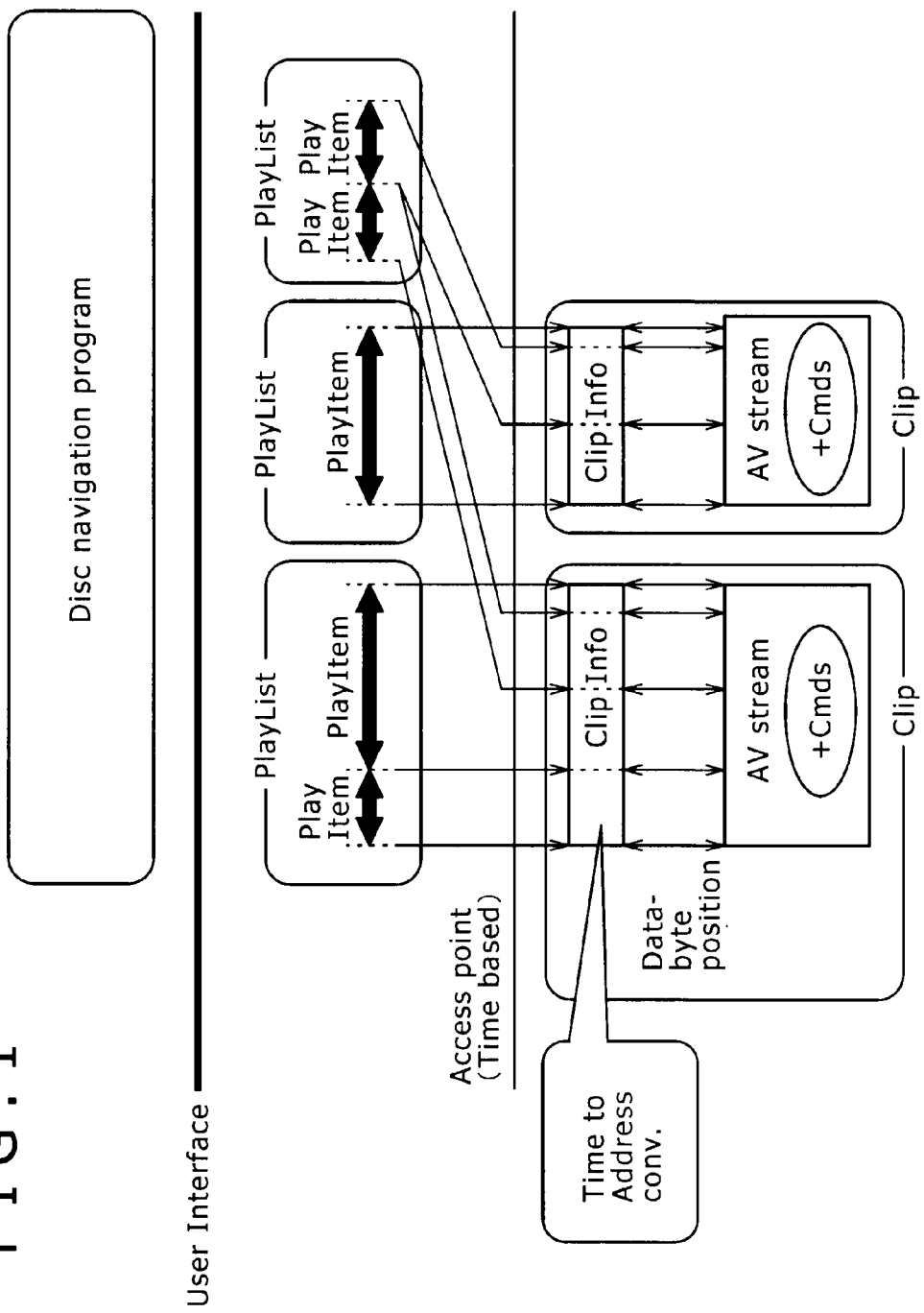
FIG. 1 is a schematic view showing an application format on a recording medium to be loaded into a player embodying the present invention.

In the ensuing description and accompanying drawings, reference numeral 1 stands for a player; 3 for a server; 11 for an optical disk; 12 for a local storage; 21 for a controller; 32 for a communication control section; 33 for an optical disk directory management section; 34 for a local storage directory management section; 35 for a file system merge processing section; 36 for a reproduction control section; 81 for a communication control section; and 82 for an update file management section.

BEST MODE FOR CARRYING OUT THE INVENTION

FIG. 1 is a schematic view showing an application format on a recording medium to be loaded into a player 1 (FIG. 2) embodying the present invention. The recording medium may illustratively be an optical disc to be discussed later, or a magnetic disc or a semiconductor memory.

The application format has two layers: a player list layer and a clip layer for managing AV (audio visual) streams. In the description that follows, one AV stream paired with its accompanying information called clip information is regarded as one object which is also called a clip. The AV stream may be called an AV stream file, and the clip information may be called a clip information file.

Generally, files used by computers are handled as byte strings. The content of an AV stream file is stretched on a time basis. The access points in a clip are designated primarily by play lists using timestamps.

If the access points in a clip are indicated by play lists using timestamps, then the clip information file may be used to find information about the addresses from which to start decoding data in the AV stream file.

A play list is a collection of reproduction segments making up an AV stream. A given reproduction segment in an AV stream is called a play item represented by an in-point (i.e., reproduction start point) paired with an out-point (reproduction end point) on the time base. Thus each play list is constituted by one or a plurality of play items as shown in FIG. 1.

In FIG. 1, the first play list from left is formed by two play items. These two play items are arranged to reference the first and the second half of the AV stream contained in the clip shown left. The second play list from left is composed of one play item which references the entire AV stream contained in the clip shown right. The third play list from left is made up of two play items, one referencing a portion of the AV stream in the left-hand side clip and the other referencing a portion of the AV stream in the right-hand side clip.

Suppose that a navigation program (e.g., disc navigation program in FIG. 1) designates the leftmost play item in the first play list from left as information indicative of the point from which to start reproduction. In that case, the first half of the AV stream contained in the left-hand side clip and referenced by the play item in question is reproduced.

The navigation program has the functions of controlling the order in which to reproduce play lists and reproducing the play lists interactively. The navigation program also has the function of displaying a menu screen on which a user may designate the execution of reproduction in many ways. Illustratively, the navigation program may be written in Java (registered trademark) or in some other suitable programming language and preinstalled on the recording medium.

Figure 2:
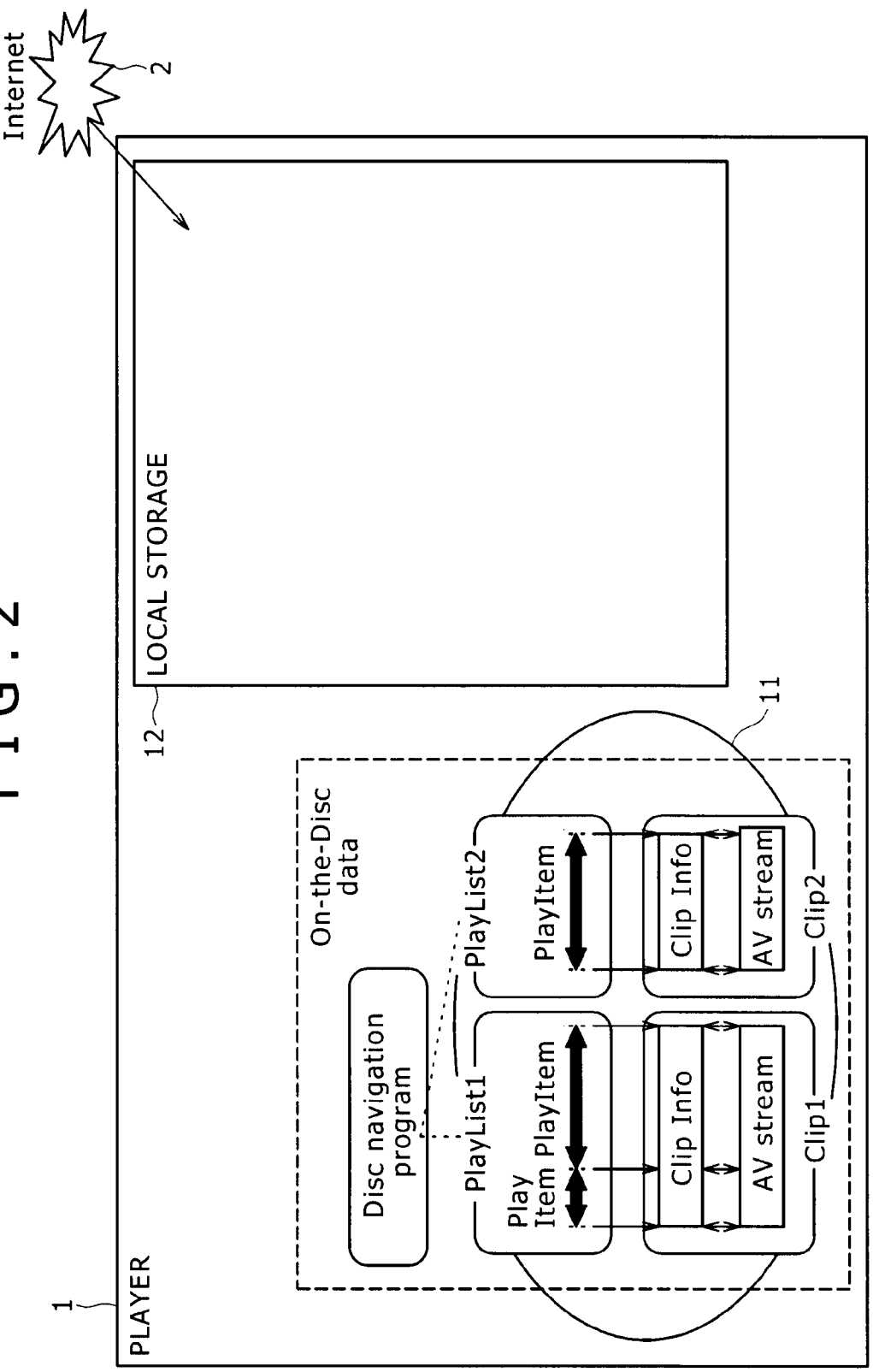
FIG. 2 is a schematic view of the player.

FIG. 2 is a schematic view of the player 1 as it reproduces data from an optical disc 11, a recording medium on which diverse kinds of data are recorded in the application format shown in FIG. 1. A detailed structure of the player 1 will be discussed later in reference to FIGS. 4 and 5.

The player 1 incorporates a local storage 12 typically constituted by a hard disc drive (HDD). The player 1, connected wirelessly or in wired fashion to the Internet 2, may download contents from a server over the Internet and store what is downloaded into the local storage 12. Illustratively, what is downloaded as contents are updates of the data recorded on the optical disc 11 (as shown in FIG. 1) currently loaded in the player 1.

It might happen that with the downloaded data recorded in the local storage 12, an instruction is given to reproduce the contents held on the optical disc 11. In such a case, the contents stored on the optical disc 11 are reproduced in associated relation with the corresponding contents in the local storage 12.

What follows is a description of how the contents recorded on the optical disc 11 are associated with the contents kept in the local storage 12 for reproduction.

Illustratively, it is assumed that the optical disc 11 shown in FIG. 2 is a piece of media sold as a package and containing a movie and that an English language audio file is recorded on the disc 11 as the only audio file for the movie.

For example, as shown in FIG. 2, a clip 1 AV stream referenced by the play items in a play list 1 recorded on the optical disc 11 is a stream for displaying videos of the movie. A clip 2 AV stream referenced by the play item in a play list 2 is a stream for outputting the voices in English in conjunction with the videos being displayed.

In the above state, even if it is desired to watch the movie recorded on the optical disc 11 with dialog in Japanese, that is impossible because of the absence of a Japanese language audio file on the disc 11. With the current disc, the user is unable to view a Japanese version of the movie.

In that case, the user downloads a Japanese language audio file for dubbing corresponding to the movie recorded on the optical disc 11 from a server over the Internet 2. In the setup of FIG. 2, no content is shown recorded in the local storage 12.

Figure 3:
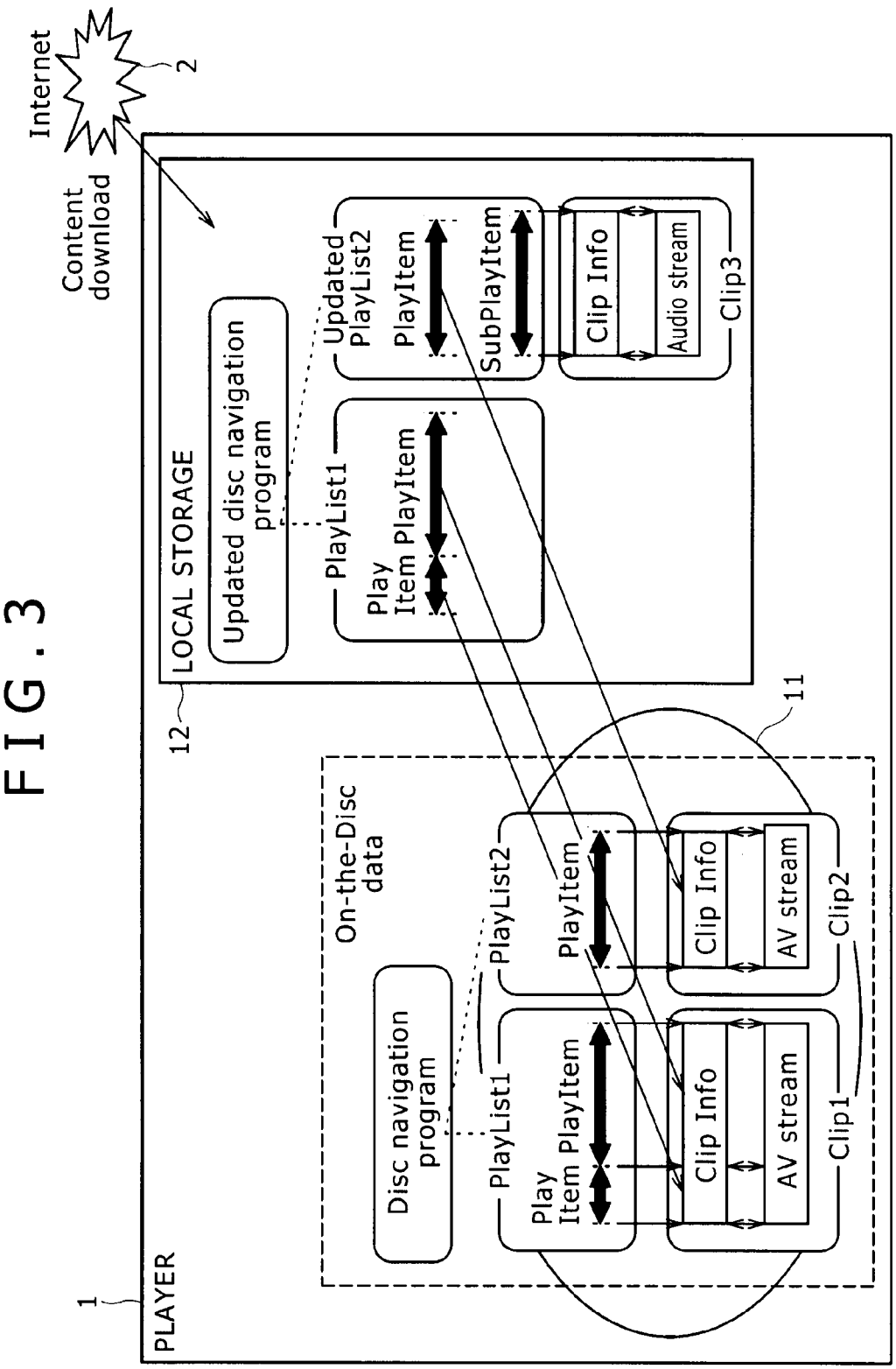
FIG. 3 is a schematic view showing the player into which files have been downloaded.

FIG. 3 is a schematic view showing the player 1 into which a Japanese language audio file corresponding to the movie recorded on the optical disc 11 has been downloaded.

More specifically, when the user gives an instruction to download an audio file in Japanese, the player 1 gains access to a relevant server. When thus accessed, the server permits the player 1 to download files arranged to update the contents recorded on the optical disc 11.

Downloaded in the example of FIG. 3 is a Japanese language audio file (i.e., audio stream file) accompanied by a clip information file, a play list file (updated play list 2 file) for controlling reproduction of the audio stream file, and an updated navigation file (updated disc navigation program file) for updating its counterpart on the optical disc 11. The downloaded files are recorded to the local storage 12. The same play list 1 as that recorded on the optical disc 11 is also stored into the local storage 12.

The updated play list 2 is made up of a play item representing the main path and a sub play item designating a sub path. The play item in the updated play list 2 references the clip 2 recorded on the optical disc 11. The sub play item references a clip 3 that includes the Japanese language audio stream file downloaded from the server along with the updated play list 2.

The updated navigation program in FIG. 3 is capable of referencing the sub play item in the updated play list 2 as the reproduction segment. This makes it possible illustratively to reproduce the audio stream file of the clip 3, i.e., the Japanese language audio file.

As described, downloading necessary files from the server allows the player 1 to reproduce as the movie audio one of the two versions: the clip 2, an English language audio file; and the clip 3, a Japanese language audio file for dubbing which is not recorded beforehand on the optical disc 11. By making the selection on the menu screen being displayed, the user can watch the movie in either of the English and the Japanese languages.

The distributor (including retailers and manufacturers) of optical discs may initially market discs carrying movies solely in the English language with the intention of providing, say, the corresponding Japanese language audio later over the Internet 2. That is, optical disc distributors can start selling their discs earlier than if they would have to prepare the Japanese language audio file for dubbing. It is also possible for the distributor to go into additional marketing regions with different languages later.

Figure 4:
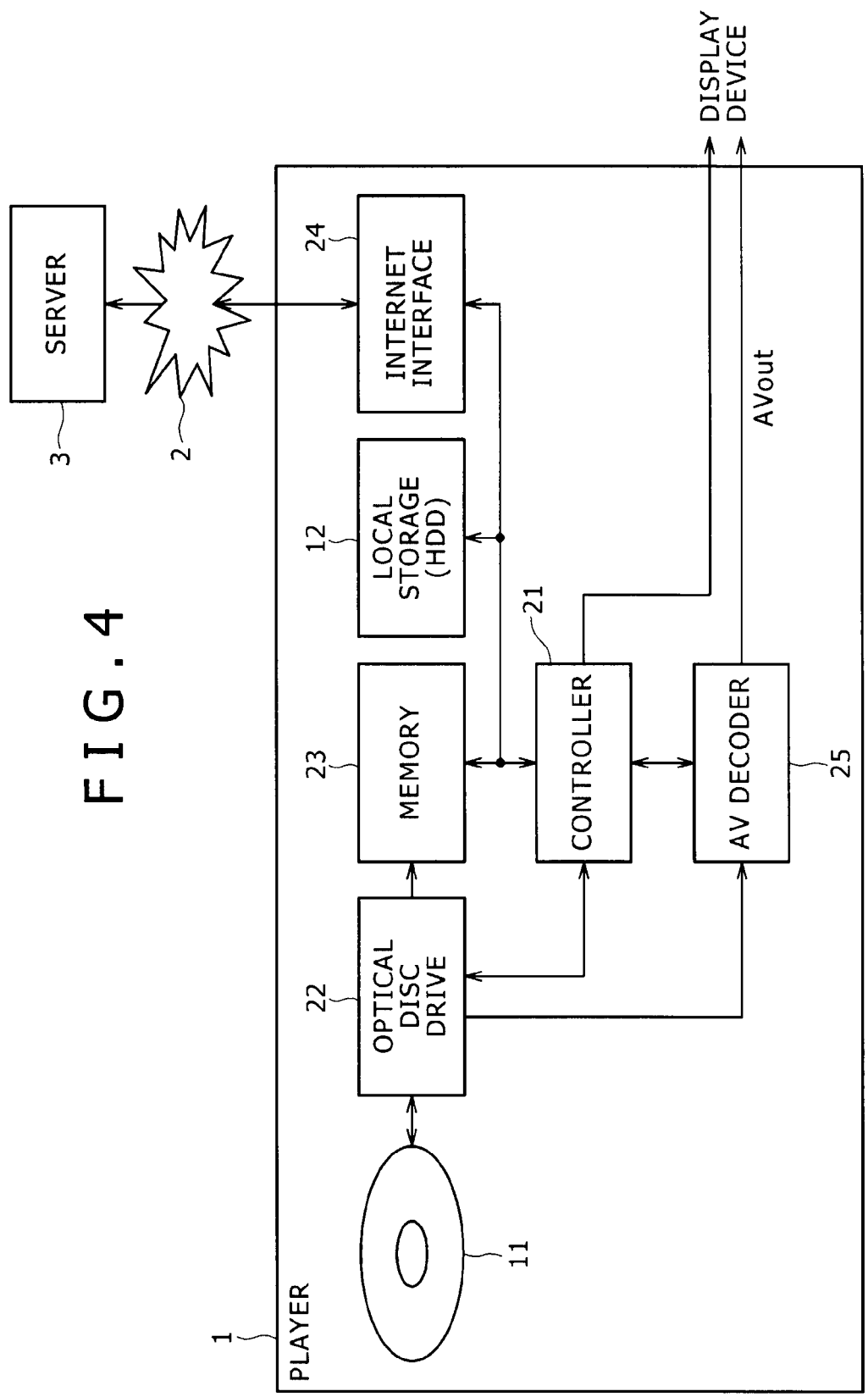
FIG. 4 is a block diagram showing a typical structure of the player.

FIG. 4 is a block diagram showing a typical structure of the player 1. In FIG. 4, the components having identical or corresponding functions to their counterparts in FIGS. 2 and 3 are designated by like reference numerals.

A controller 21 controls an optical disc drive 22 as a whole by executing a preinstalled control program or by causing the drive 22 to read the navigation program held on the optical disc 11 and loading the retrieved program into a memory 23 for execution. Illustratively, when the optical disc 11 is loaded, the controller 21 causes an external display device to display an appropriate menu screen.

Under control of the controller 21, the optical disc drive 22 reads data from the optical disc 11 and outputs the retrieved data to the memory 23 and an AV decoder 25. That is, the navigation program and such information as play lists are output to the memory 23, and the AV streams are output to the AV decoder 25.

The memory 23 accommodates data needed by the controller 21 in carrying out diverse processes. The local storage 12 stores the files that have been downloaded from a server 3 over the Internet 2 as described above.

An Internet interface 24 conducts communications with the server 3 over the Internet 2 under control of the controller 21. The data downloaded from the server 3 is supplied through the Internet interface 24 to the local storage 12.

The AV decoder 25 decodes the AV stream supplied from the optical disc drive 22 and outputs the video and audio signals resulting from the decoding to the external display device. Given the decoded signals from the AV decoder 25, the display device outputs the contents (i.e., video display and audio output) that are recorded illustratively on the optical disc 11.

Figure 5:
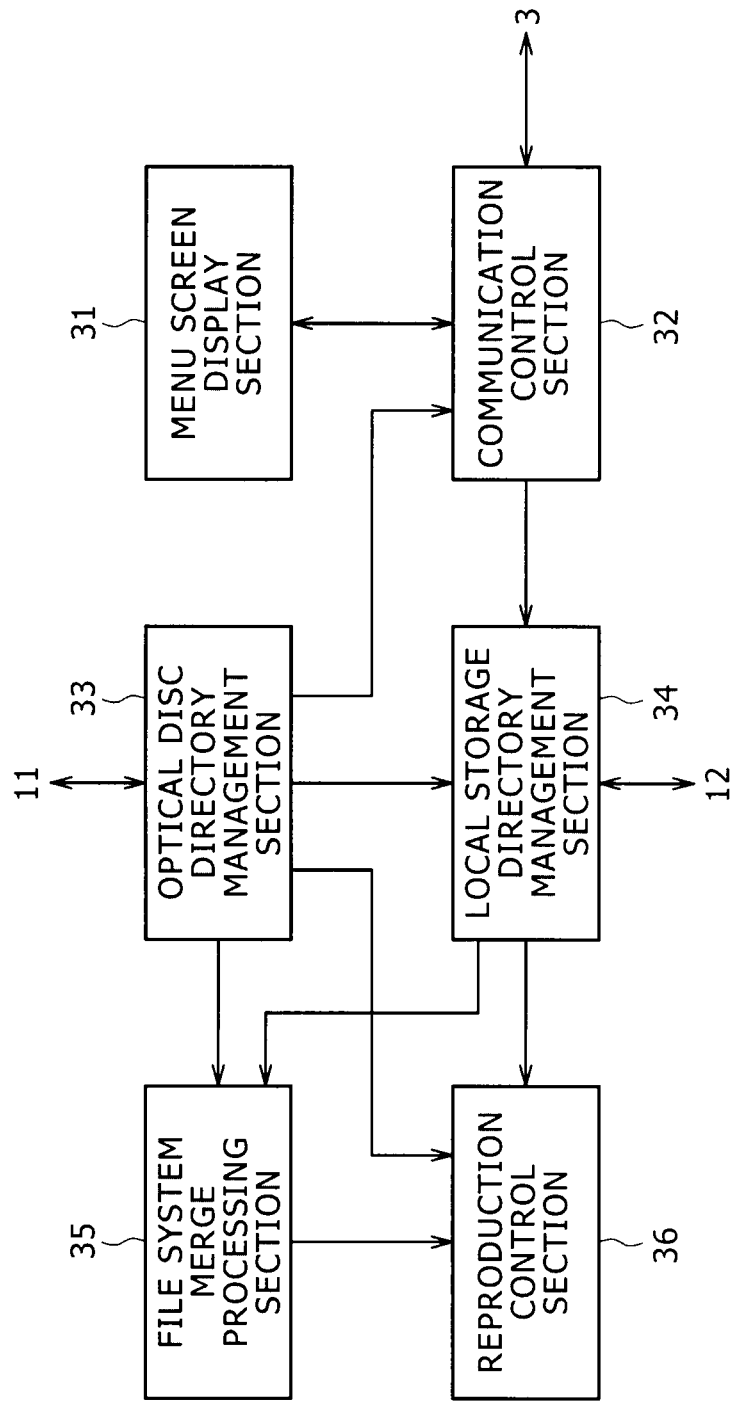
FIG. 5 is a block diagram showing a typical functional structure of a controller included in FIG. 4.

FIG. 5 is a block diagram showing a typical functional structure of the controller 21 included in FIG. 4.

The functions in FIG. 5 are implemented illustratively by the controller 21 executing the preinstalled control program or carrying out the navigation program recorded on the optical disc 11.

A menu screen display section 31 causes the external display device to display a menu screen that includes indications of the language or languages used in the contents recorded on the optical disc 11, buttons to be operated by the user in selecting angles of the movie, and user-operable buttons for selecting the update files to be downloaded. The menu screen display section 31 detects input from the user and outputs to a communication control section 32 signals that are representative of the user's input.

The communication control section 32 controls communications performed through the Internet interface 24 shown in FIG. 4. Illustratively, the communication control section 32 downloads user-designated update files from the server 3 and outputs the acquired files to a local storage directory management section 34.

An optical disc directory management section 33 manages the directories of the optical disc 11 and reads data therefrom. The optical disc 11 has Studio_id and Content_id recorded thereon as its identification information. The optical disc directory management section 33 reads Studio_id and Content_id from the optical disc 11, outputs what is read to the communication control section 32 and local storage directory management section 34, and outputs such data as play lists and AV streams to a reproduction control section 36. If the file system of the optical disc 11 and the file system of the local storage 12 are to be merged by a file system merge processing section 35, as will be described later, the optical disc directory management section 33 outputs the file system of the optical disc 11 to the file system merge processing section 35.

The local storage directory management section 34 manages the directories of the local storage 12. In so doing, the local storage directory management section 34 writes and reads data to and from the local storage 12. Illustratively, the local storage directory management section 34 reads the play lists and AV streams from the optical disc 11 and outputs what has been read out to the reproduction control section 36. If the file system merge processing section 35 is to merge file systems, the local storage directory management section 34 outputs to the file system merge processing section 35 the file system of the local storage 12 as in the case of the optical disc directory management section 33.

The file system merge processing section 35 merges the file system of the optical disc 11 supplied from the optical disc directory management section 33 and the file system of the local storage 12 fed from the local storage directory management section 34, into a virtual file system. The file system merge processing section 35 outputs the virtual file system resulting from the merge to the reproduction control section 36. In the description that follows, the file system created by the file system merge processing section 35 through merge will be called the virtual file system where appropriate.

The reproduction control section 36 carries out the navigation program designated by the virtual file system supplied from the file system merge processing section 35. The reproduction control section 36 then causes the AV decoder 25 in FIG. 4 to decode (i.e., reproduce) the AV streams recorded on the optical disc 11 or in the local storage 12.

What follows is a description of how the file system merge processing section 35 merges the file system of the optical disc 11 and the file system which has been downloaded from the server 3 and recorded to the local storage 12. The merge is performed illustratively when an instruction is given to reproduce the contents recorded on the optical disc 11.

FIG. 6 is a schematic view showing a typical file system of the optical disc 11 (shown on the left) and a typical file system of the local storage 12 (shown on the right). As illustrated, each file system has a directory structure.

Under the "root" of the optical disc 11 is a folder called "BDMV." The folder contains a file named "info.bdmv" and a file named "Navigation.class." These files may be called the "info.bdmv" file and "Navigation.class" file where appropriate in the ensuing description. Other files and folders may be called likewise, with their names placed first followed by the word "file" or "folder."

The "info.bdmv" file has two items of identification information described therein: Studio_id for identifying the manufacturer of the optical disc 11, and Content_id for identifying the content recorded on the disc 11.

That is, Studio_id and Content_id serve to identify the content recorded on the optical disc 11 from among all contents being marketed. In the example of FIG. 6, Studio_id is given as "xxx" and Content_id as "yyy." Studio_id and Content_id are also used to identify each update file downloaded.

The "Navigation.class" file denotes a navigation program written in a suitable programming language.

The "BDMV" folder further contains a folder named "PLAYLIST" ("PLAYLIST" folder), a folder named "CLIPINF" ("CLIPINF" folder), and a folder named "STREAM" ("STREAM" folder).

In FIG. 6, the "PLAYLIST" folder contains a file named "11111.mpls" and a file named "22222.mpls." These files constitute play lists designating the reproduction segments of an AV stream file by use of timestamps.

The "CLIPINF" folder contains a file named "01000.clpi" and a file named "02000.clpi." These files constitute clip information representing the correspondence between timestamps and the address information of the AV stream file.

The "STREAM" folder contains a file named "01000.m2ts" and a file named "02000.m2ts." These files constitute AV streams.

Under the "root" of the local storage 12 is a folder named "xxx-yyy." The folder name "xxx-yyy" indicates that the data held in this folder corresponds to the content recorded on the optical disc 11 and identified by Studio_id "xxx" and Content_id "yyy." As will be discussed later, the "xxx-yyy" folder is created when the optical disc 11 carrying Studio_id "xxx" and Content_id "yyy" is loaded into the player 1 and the update files (i.e., files contained in the "xxx-yyy" folder) are downloaded.

The "xxx-yyy" folder contains an "info.bdmv" file and a "Navigation.class" file. The "info.bdmv" file is the same as the file having the identical name on the optical disc 11. The "Navigation.class" file is an update of the file having the same name on the optical disc 11. In other words, the "Navigation.class" file in the local storage 12 is a file that describes an update of the navigation program recorded on the optical disc 11.

The "xxx-yyy" folder further contains a "PLAYLIST" folder, a "CLIPINF" folder and a "STREAM" folder.

In FIG. 6, the "PLAYLIST" folder in the local storage 12 contains a file named "11111.mpls" and a file named "22222.mpls." The file named "22222.mpls" is an update of the file having the same name on the optical disc 11. Illustratively, the file named "22222.mpls" in the local storage 12 represents a downloaded update play list 2 (FIG. 3). This file describes data in which a play list is supplemented with a sub play item.

The "CLIPINF" folder in the local storage 12 contains a file named "01000.clpi" and a file named "02000.clpi," both of which are also found on the optical disc 11, as well as a file named "04000.clpi." The file named "04000.clpi" is a file newly acquired by downloading and constitutes illustratively the clip information in the clip 3 shown in FIG. 3.

The "STREAM" folder in the local storage 12 contains a file named "04000.m2ts." This is a file newly acquired by downloading and constitutes illustratively the audio stream in the clip 3 shown in FIG. 3.

Likewise in the example of FIG. 6, under the "root" in the local storage 12 are a folder named "xxx-aaa" and a folder named "yyy-bbb." The folder named "xxx-aaa" is created when the optical disc identified by Studio_id "xxx" and Content_id "aaa" is loaded into the player 1; the folder named "yyy-bbb" is created when the optical disc identified by Studio_id "yyy" and Content_id "bbb" is loaded into the player 1. These folders contain the files corresponding to the contents stored on the respective optical discs.

When the above-described file systems are found on the optical disc 11 and in the local storage 12, the file system merge processing section 35 of the controller 21 merges the file system of the optical disc 11 and that of the local storage 12 into a virtual file in the memory 23.

More specifically, if a file having the same name exists both on the optical disc 11 and in the local storage 12, the file merge processing section 35 merges the two files in such a manner that with the timestamps (creation date) and versions of the files taken into account, the downloaded file is arranged to be referenced upon reproduction of content. If a file exists in the local storage 12 and its counterpart is absent on the optical disc 11, then the file merge processing section 35 performs a merge such that the file in the local storage 12 is arranged to be referenced upon reproduction of content.

Figure 7:
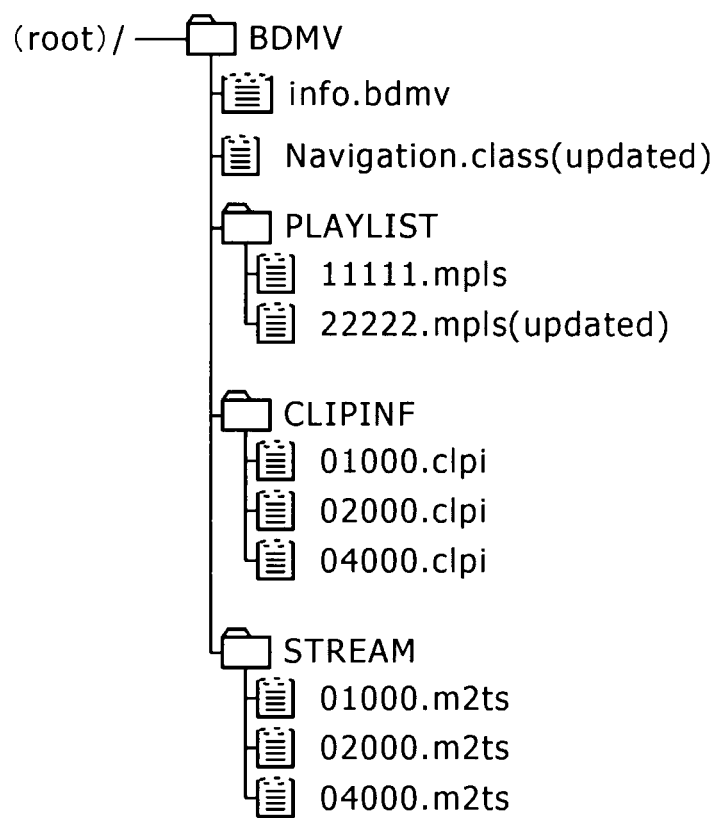
FIG. 7 is a schematic view showing a file system obtained by merging the two file systems shown in FIG. 6.

FIG. 7 is a schematic view showing a virtual file system obtained by merging the two file systems shown in FIG. 6.

As shown in FIG. 7, of the files recorded on the optical disc 11, the "Navigation.class" file and the file named "22222.mpls" are updated (i.e., replaced) with their downloaded counterparts. The file named "04000.clpi" and the file named "04000.m2ts," not found on the optical disc 11, are added.

More specifically, if the downloaded files include an updated navigation program and any updated play list, such files are used to update (i.e., replace) the files having the same names on the optical disc 11. If any clip files not found on the optical disc 11 are downloaded (e.g., clip information file, AV stream files), these files are added to the file system.

With the virtual file system thus created, AV streams are accessed by the navigation program through that system. (It should be noted that the optical disc 11 or the local storage 12 is not directly accessed.)

What follows is a description of the syntax of play lists, play items, and sub play items.

FIG. 8 shows a typical syntax of a play list.

In FIG. 8, "length" is a 32-bit unsigned integer indicating the number of bytes ranging from the end of this "length" field to the end of "PlayList( )" The "length" field is followed by a 12-bit field named "reserved_for_align."

"PL_CPI_type" is a four-bit field indicating the value of "CPI_type" of the clip referenced by "PlayItem( )" and "SubPlayItem( )" "number_of_PlayItems" is a 16-bit field indicating the number of play items in this play list.

"number_of_SubPlayItems" is a 16-bit field indicating the number of sub play items in this play list. This value is either 0 or 1. An added audio stream path is one type of sub path.

FIG. 9 is a tabular view showing a typical syntax of a play item.

One "PlayItem( )" includes "length" indicating the length of this play item, "Clip_Information_file_name" designating the file name of a clip, and "Clip_codec_identifier" denoting the codec method for the clip, as well as "reserved_for_future_use" and "connection_condition."

FIG. 10 is a tabular view showing a typical syntax of a sub play item.

"SubPlayItem( )" includes "length" indicating the length of the play item, "Clip_information_file_name" denoting the clip, "Clip_codec_identifier" designating the codec method for the clip, "SubPlayItem_type" representing a sub path type, and "ref_to_STC_id" constituting information about STC non-contiguous points (i.e., non-contiguous points of the system time base).

"SubPlayItem( )" further includes "SubItem_IN_time" and "SubItem_OUT_time" for designating a sub item reproduction segment in the clip, as well as "sync_PlayItem_id" and "sync_start_PTS_of_PlayItem" for allowing the sub item to designate a reproduction start time on the time base of the main item.

Details about the syntax of play lists, play items, and sub play items are disclosed illustratively in Japanese Patent Laid-Open No. 2002-158972.

Figure 11:
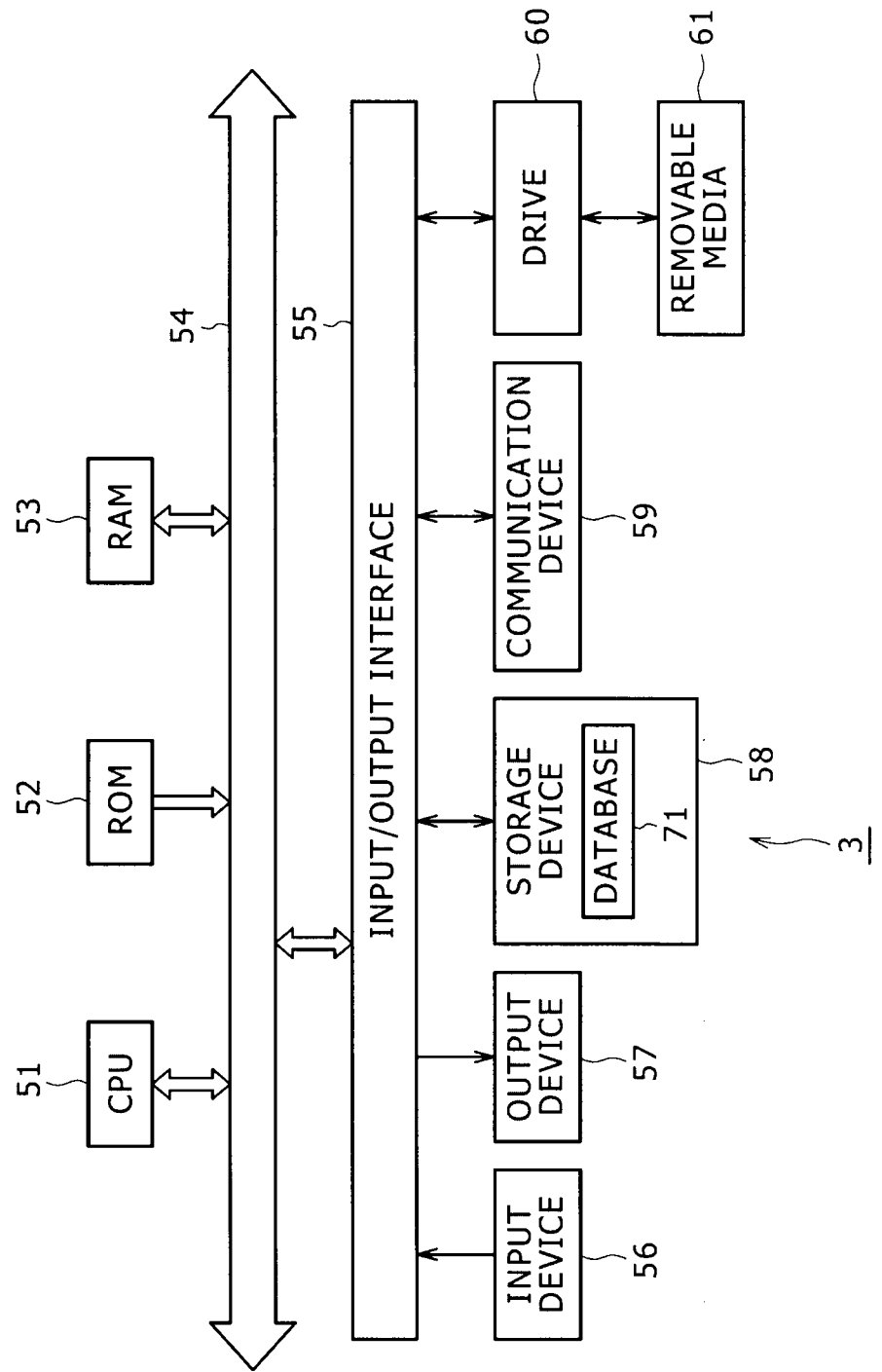
FIG. 11 is a block diagram showing a typical structure of a server.

FIG. 11 is a block diagram showing a typical structure of the server 3 indicated in FIG. 4.

A CPU (central processing unit) 51 performs various processes in accordance with the programs held in a ROM (read only memory) 52 or those loaded from a storage device 58 into a RAM (random access memory) 53. The RAM 53 may also accommodate data and other resources needed by the CPU 51 in carrying out its processing.

The CPU 51, ROM 52, and RAM 53 are interconnected by a bus 54. An input/output interface 55 is also connected to the bus 54.

The input/output interface 55 is further connected with an input device 56, an output device 57, the storage device 58, and a communication device 59. The input device is constituted typically by a keyboard and a mouse. The output device is made up of a display such as LCD (liquid crystal display) and speakers. The storage device 58 is typically composed of a hard disc drive. The communication device 59 conducts communications with the player 1 or with other equipment via the Internet 2. The storage device 58 contains a database 71 in which to store the update files to be offered to the player 1 having accessed the server 3.

A drive 60 may be connected to the input/output interface 55 as needed. Removable media such as a magnetic disc, an optical disc, a magneto-optical disc or a semiconductor memory may be loaded into the drive 60.

Figure 12:
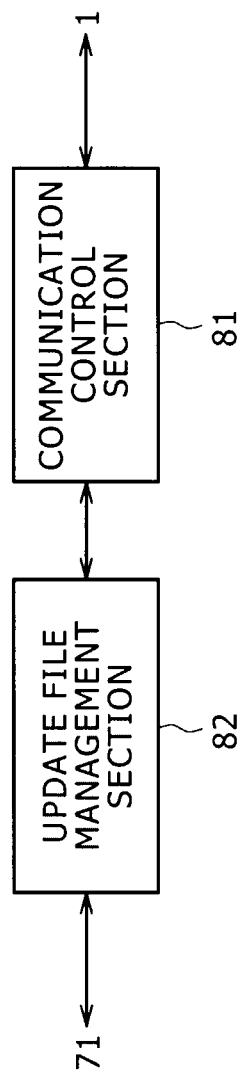
FIG. 12 is a schematic view showing a typical functional structure of the server.

On the side of the server 3 structured as outlined above, the functional sections shown in FIG. 12 are implemented illustratively by the CPU 51 executing its control programs.

A communication control section 81 is implemented to have the communication device 59 control its communications with the player 1. Illustratively, the communication control section 81 outputs Studio_id and Content_id sent from the player 1 to an update file management section 82. When the update files to be provided to the player 1 are supplied from the update file management section 82, the communication control section 81 forwards them to the player 1 over the Internet 2.

The update file management section 82 identifies the optical disc 11 loaded in the player 1 on the basis of Studio-id and Content_id fed from the communication control section 81, and acquires from the database 71 the update files corresponding to the content recorded on the optical disc 11. The update file management section 82 outputs the update files obtained from the database 71 to the communication control section 81. In turn, the communication control section 81 provides the update files to the player 1.

How the player 1 and server 3 structured as discussed above operate will now be described by referring to the accompanying flowcharts.

Figure 13:
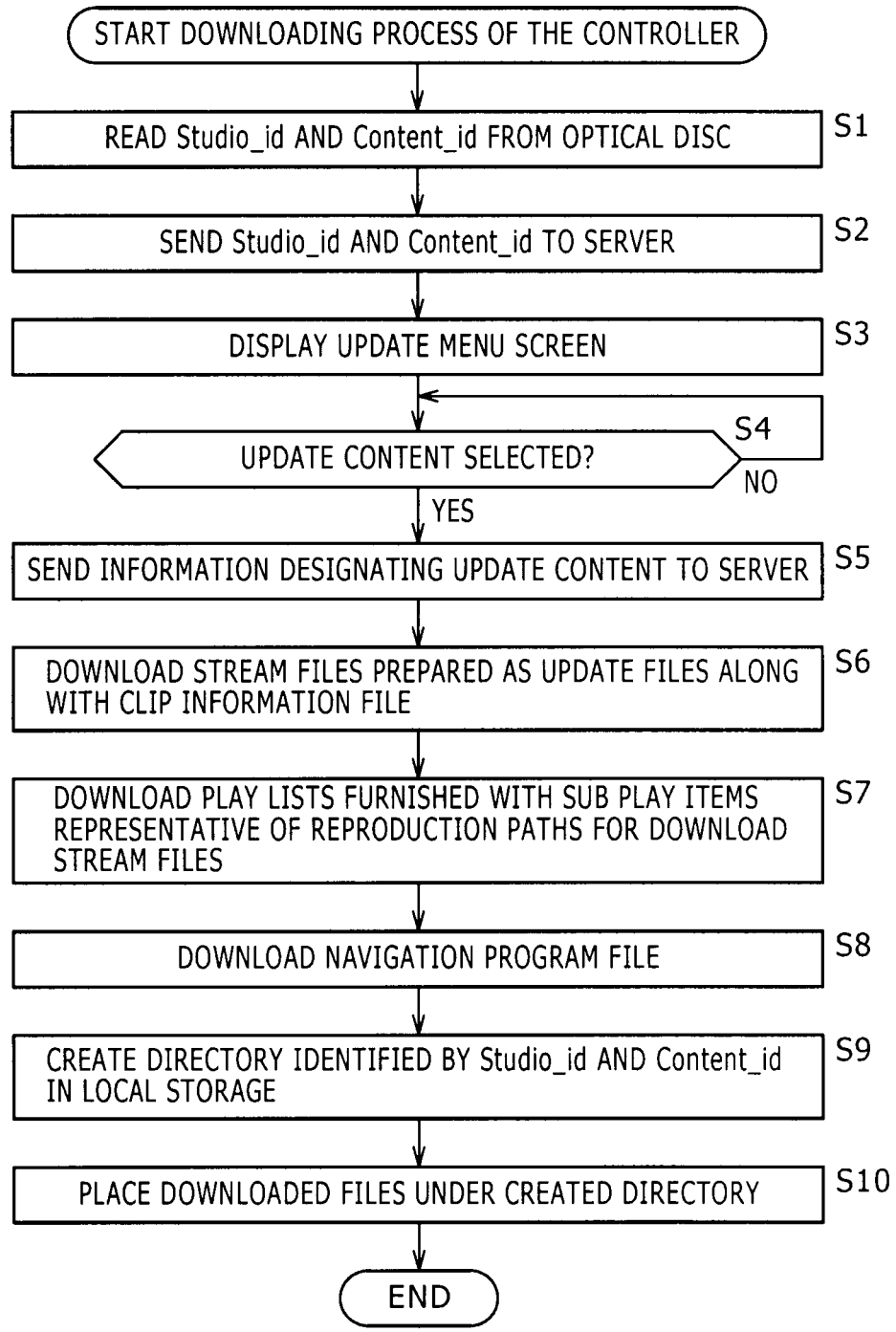
FIG. 13 is a flowchart of steps constituting a process performed by the controller when it downloads update files.

First to be described in reference to the flowchart of FIG. 13 is a process performed by the controller 21 in downloading update files from the server 3.

This process is carried out illustratively when the optical disc 11 is loaded into the player 1, with an instruction given through the menu screen to download a Japanese language audio file for use in conjunction with the movie stored on the disc 11.

In step S1, the optical disc directory management section 33 of the controller 21 causes the optical disc drive 22 to read Studio_id and Content_id from the optical disc 11. As explained above with reference to FIG. 6, Studio_id and Content_id are found in the "info.bdmv" file. The optical disc directory management section 33 outputs Studio_id and Content_id read from the optical disc 11 to the communication control section 32 and local storage directory management section 34.

In step S2, the communication control section 32 causes the Internet interface 24 to transmit to the server 3 Studio_id and Content_id sent from the optical disc directory management section 33. Upon receipt of Studio_id and Content_id thus transmitted, the server 3 identifies the content stored on the optical disc 11 loaded in the player 1. At this point, the server 3 notifies the player 1 of a list of files that can be updated.

In step S3, the menu screen display section 31 causes the display device to display an update menu screen. In step S4, the menu screen display section 31 checks to determine whether the user has operated any button on the menu screen to select what is to be updated.

In step S4, the menu screen display section 31 waits for an update to be selected. When any update is found selected, step S5 is reached. The menu screen display section 31 outputs to the communication control section 32 information about the update that has been selected by the user.

In step S5, the communication control section 32 sends the information about the update to the server 3. In so doing, the communication control section 32 requests downloading of necessary update files from the server 3.

In step S6, the communication control section 32 downloads from the server 3 AV stream files prepared as update files along with the accompanying clip information file.

In step S7, the communication control section 32 downloads the play lists of which the main play item is furnished with sub play items representative of the reproduction paths for the AV stream files downloaded in step S6. The sub play items of the downloaded play lists are arranged illustratively to reference the AV stream files constituting the Japanese language audio file for dubbing purposes.

In step S8, the communication control section 32 downloads the file of an updated navigation program. The files downloaded by the communication control section 32 are output to the local storage directory management section 34.

In step S9, the local storage directory management section 34 creates in the local storage 12 a directory identified by Studio_id and Content_id supplied from the optical disc directory management section 33. In this manner, a folder (i.e., directory) named "xxx-yyy" corresponding to the optical disc 11 having Studio_id "xxx" and Content_id "yyy" is created in the local storage 12 as shown in FIG. 6.

In step S10, the local storage directory management section 34 places under the directory created in step S9 the files that have been downloaded from the server 3 and supplied through the communication control section 32.

Figure 14:
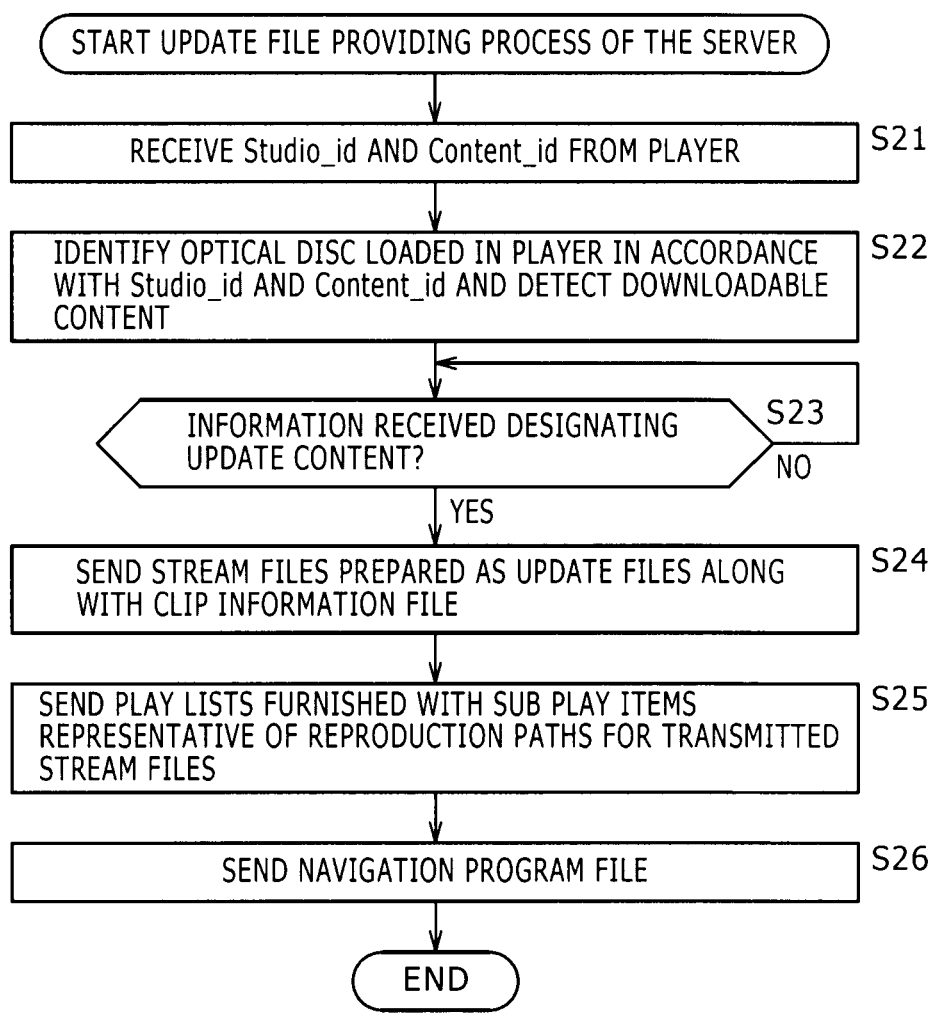
FIG. 14 is a flowchart of steps constituting a process performed by the server in response to the process of FIG. 13.

Described below with reference to the flowchart of FIG. 14 is an update file providing process carried out by the server 3 in keeping with the process performed by the controller 21 as shown in FIG. 13.

In step S21, the communication control section 81 (FIG. 12) causes the communication device 59 to receive Studio_id and Content_id sent from the player 1 over the Internet 2. As discussed above, the player 1 reads Studio_id and Content_id from the optical disc 11 and sends what has been read to the server 3 (in step S2 of FIG. 13). Studio_id and Content_id received by the communication control section 81 are output to the update file management section 82.

In step S22, the update file management section 82 identifies the optical disc loaded in the player 1 on the basis of Studio_id and Content_id supplied from the communication control section 81. With the optical disc thus identified, the update file management section 82 detects from the database 71 the update files that can be provided through downloading. Illustratively, a list of the detected available update files is transmitted to the player 1. In turn, the transmitted list is displayed on the menu screen as a table of downloadable contents.

In step S23, the communication control section 81 checks to determine whether information representative of the desired update is sent from the player 1. The communication control section 81 waits for information about any update to arrive. When information indicative of the update is found transmitted in step S23, step S24 is reached. The information indicative of the update received by the communication control section 81 is forwarded to the update file management section 82.

In step S24, the update file management section 82 acquires from the database 71 AV stream files provided as update files and the accompanying clip information in response to what is requested from the player 1. The acquired files are transmitted to the player 1 through the communication control section 81.

In step S25, the update file management section 82 acquires from the database 71 the play lists of, which the play item is furnished with sub play items representative of the reproduction paths for the AV stream files transmitted in step S24. The acquired files are sent to the player 1 through the communication control section 81.

In step S26, the update file management section 82 causes the communication control section 81 to transmit an updated navigation program to the player 1. On the side of the player 1, the transmitted files are stored into the local storage 12.

Illustratively, with the above-described steps carried out, the updated navigation program, updated play list 2, and audio stream shown in FIG. 3 are placed into the local storage 12 of the player 1.

Figure 15:
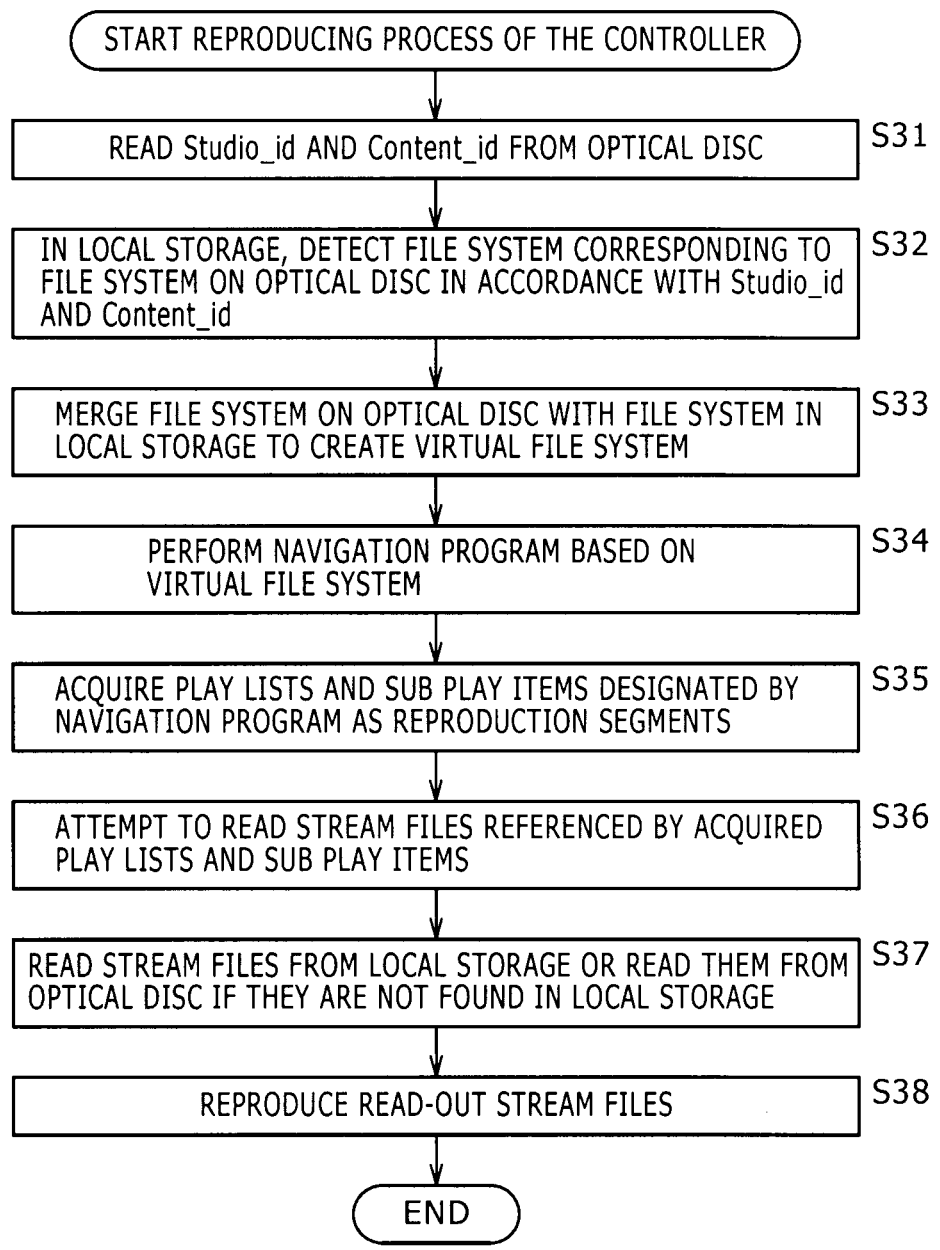
FIG. 15 is a flowchart of steps constituting a process performed by the controller when it reproduces content.

Described below with reference to the flowchart of FIG. 15 is a process performed by the controller 21 in reproducing contents.

Suppose that with the downloaded update files stored in the local storage 12, an instruction is given to reproduce the content recorded on the optical disc 11. In that case, the optical disc directory management section 33 going to step S31 reads Studio_id and Content_id from the optical disc 11 and outputs what has been read to the local storage directory management section 34.

In step S32, the local storage directory management section 34 searches through the local storage 12 for a file system corresponding to the file system of the optical disc 11 on the basis of Studio_id and Content_id sent from the optical disc directory management section 33. As described above, the file system corresponding to that of the optical disc 11 is stored under the directory having a name containing Studio_id and Content_id (FIG. 6).

At this point, the optical disc directory management section 33 outputs the file system of the optical disc 11 to the file system merge processing section 35. The local storage directory management section 34 outputs the file system of the local storage 12 corresponding to the file system of the optical disc 11.

In step S33, the file system merge processing section 35 merges the file system of the optical disc 11 with that of the local storage 12 into a single virtual file system as described above with reference to FIGS. 6 and 7. The virtual file system thus created is output to the reproduction control section 36 for use in reproducing AV stream files.

In step S35, the reproduction control section 36 designates the navigation program from the supplied virtual file system and executes the designated program. That is, if the updated navigation program is found in the virtual file system as shown in FIG. 7, then that navigation program (recorded in the local storage 12) is carried out.

The reproduction control section 36 in step S35 acquires the play list and sub play item designated as the reproduction segment by the navigation program, and goes to step S36. In step S36, the reproduction control section 36 attempts to read the stream files referenced by the acquired play list and sub play item. In this example, the timestamps denoted by the play list and sub play item are translated into addresses through clip information so that relevant AV streams may be accessed.

If in step S37 any AV stream file referenced by the play list and sub play item is found in the local storage 12, then the reproduction control section 36 reads that AV stream file from the local storage 12. If no such AV stream file is found in the local storage 12, then the reproduction control section 36 reads the AV stream file in question from the optical disc 11.

For example, if the reproduction control section 36 reads AV streams in accordance with the file system of FIG. 7, then the AV stream file named "01000.m2ts" and AV stream file named "02000.m2ts" are read from the optical disc 11. The Av stream file named "04000.m2ts," which has been added through downloading, is read from the local storage 12.

In step S38, the reproduction control section 36 causes the AV decoder 25 to decode the retrieved AV stream files so that the reproduced images and sounds may be output from the display device.

When the virtual file system is created and utilized as described above upon reproduction of contents, the AV stream files illustratively referenced by sub play items are reproduced. If these AV stream files constitute a Japanese language audio file, then the dialog is output in Japanese.

The downloaded update files are preserved in the local storage 12. If the same optical disc is later loaded again, the preserved files will be utilized for reproduction of the AV stream files. Illustratively, if a Japanese language audio file has been downloaded as explained above, the user need not get the player 1 to download the same file again when having the movie on the optical disc 11 reproduced again by the player 1. The user will have a choice between the English and the Japanese language versions right from the beginning.

The downloading of such update files may be made chargeable or may be permitted free of charge.

If the user designates downloading of audio files in a plurality of languages through the menu screen, the AV stream files of all languages involved need not be provided separately. Instead, these files may be rearranged by the server 3 into a single AV stream file that is then provided to the user. In this case, the positions of the AV streams in the respective languages are designated by play lists.

Described above were some cases in which audio files in languages different from that recorded, on the optical disc 11 are made available through downloading. However, the files to be provided are not limited to the audio files. Alternatively, images (i.e., moving or still pictures) or subtitles not recorded on the optical disc 11 may later be provided through downloading. It is also possible to provide not AV stream files but play lists for designating new reproduction segments or solely the navigation program through downloading.

The inventive arrangements above make diverse forms of content distribution possible. Illustratively, optical discs may be marketed initially carrying movies free of violent scenes (that could be harmful to children), and the purged scenes may later be provided as update files through downloading.

In the foregoing description, it was assumed that the data recorded on the optical disc is not pirated or reproduced by an illegitimate program run on the player 1 in manners not envisaged by the manufacturer of the disc. Still, it will be necessary to provide against such abuses.

There are two major techniques for preventing the illegal uses of the data stored on the optical disc:

(1) When a different content (i.e., update files) associated with the optical disc in question is to be downloaded illustratively over the Internet 2, a technique is necessary for restricting a download source server. That is, what is needed is the technique of allowing the content to be downloaded only from the server authorized by the manufacturer of the optical disc.

When the content of interest is made downloadable only from a legitimate server approved by the optical disc manufacturer, it is possible to prevent the content from getting reproduced from the optical disc in ways not authorized by the disc manufacturer.

(2) When the content recorded on the optical disc is to be reproduced in associated relation with the content stored in the local storage, a technique is necessary for limiting the content of interest to be reproduced from within the local storage. That is, what is needed is the technique of allowing only the content authorized by the optical disc manufacturer to be reproduced from among the contents held in the local storage.

When only the content approved by the optical disc manufacturer is made reproducible from among the contents in the local storage, it is also possible to prevent the recorded content from getting reproduced from the optical disc in manners not authorized by the manufacturer.

If the above two techniques were not provided, it might happen that an illicit navigation program overriding, say, age restrictions (e.g., R-18) on the content in question is installed on a local disc so as to let the content be reproduced freely without regard to the initially established constraints.

Figure 16:
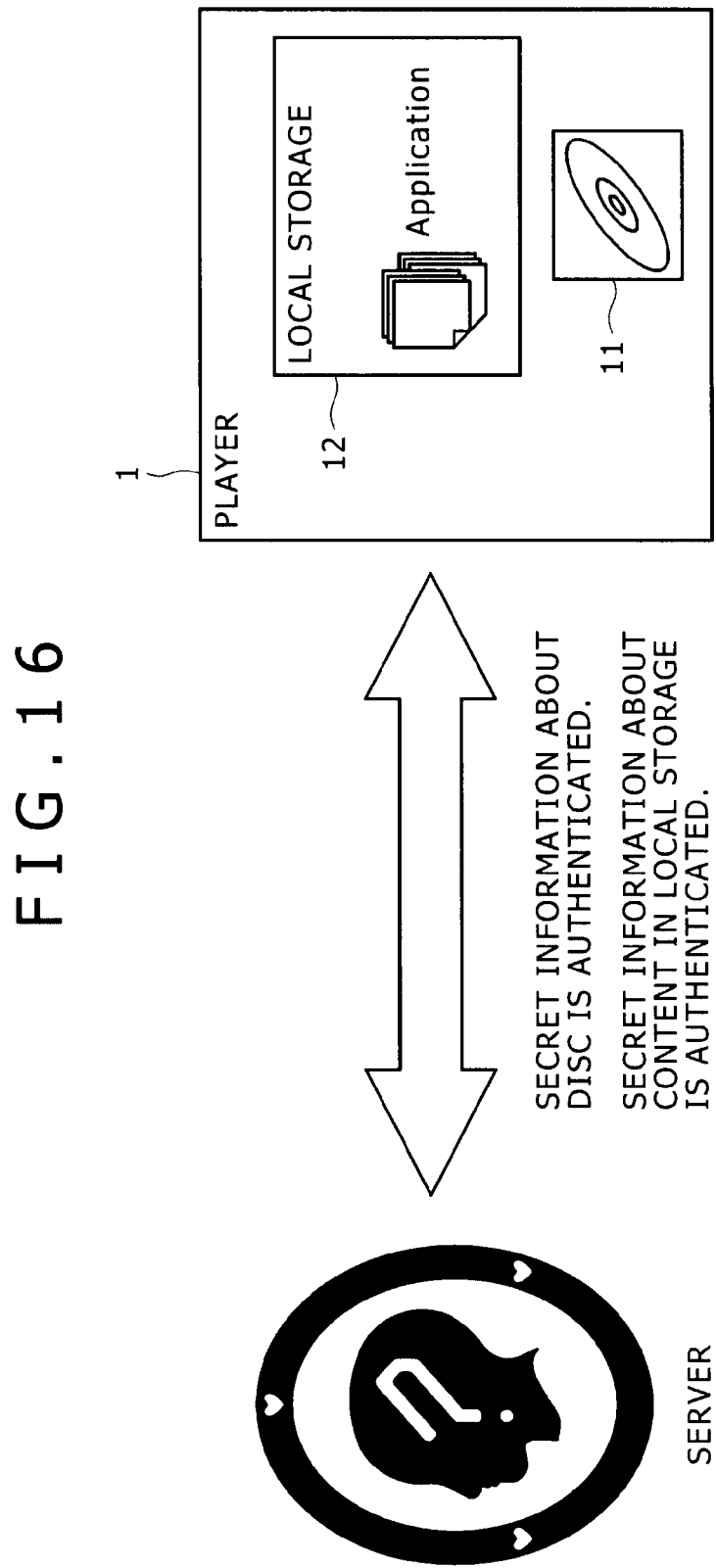
FIG. 16 is a schematic view outlining the concept of an authentication system.

FIG. 16 is a schematic view outlining the concept of an authentication system constituted by the player 1 and by a server acting as the source from which to download update files.

First to be explained is the above technique (1) for restricting the download source server from which to download over the Internet 2 the update files related to the optical disc of interest.

This technique involves authenticating the presumed download source server on the assumption that the server should know secret information about the optical disc 11 if the server has been authorized by the manufacturer of the disc 11 being loaded in the player 1.

More specifically, the player 1 initially retrieves the secret information from the optical disc 11, questions the server about the retrieved information, and checks to determine whether the server returns a correct response to the question. If the server is found to have returned the correct response, the player 1 authenticates the server as valid.

The question sent by the player 1 to the server may include the following:

A secret password is recorded on the optical disc 11. The player 1 thus requests the server to answer the value of that password.

The player 1 requests the server to answer the data value (1 or 0) at a particular address on the optical disc 11.

Explained next is the second technique (2) above for restricting reproduction of the content stored in the local storage 12 when that content is to be reproduced in associated relation with the content recorded on the optical disc 11.

This technique involves authenticating the presumed download source server on the assumption that the server should know secret information about the content stored in the local storage if the server has been authorized by the manufacturer of the optical disc 11 whose content has already been downloaded (e.g., navigation program) to the local storage 12.

More specifically, the player 1 first retrieves the secret information about the content stored in the local storage 12, questions the server about the retrieved information, and checks to determine whether the server returns a correct response to the question. If the server is found to have returned the correct response, the player 1 authenticates the content held in the local storage 12 as valid.

The question sent this time by the player 1 to the server may include the following:

An electronic watermark is embedded in the navigation program file stored in the local storage 12. The player 1 thus requests the server to answer the embedded value. If the navigation file program is written in Java®, then its electronic watermark is found in the navigation class file (see FIG. 6).

The reliability of the authentication through questioning can be raised by having a plurality of questions answered. A correct response to a single question could be a sheer coincidence. That possibility can be minimized by asking the server to respond to multiple questions correctly.

Figure 17:
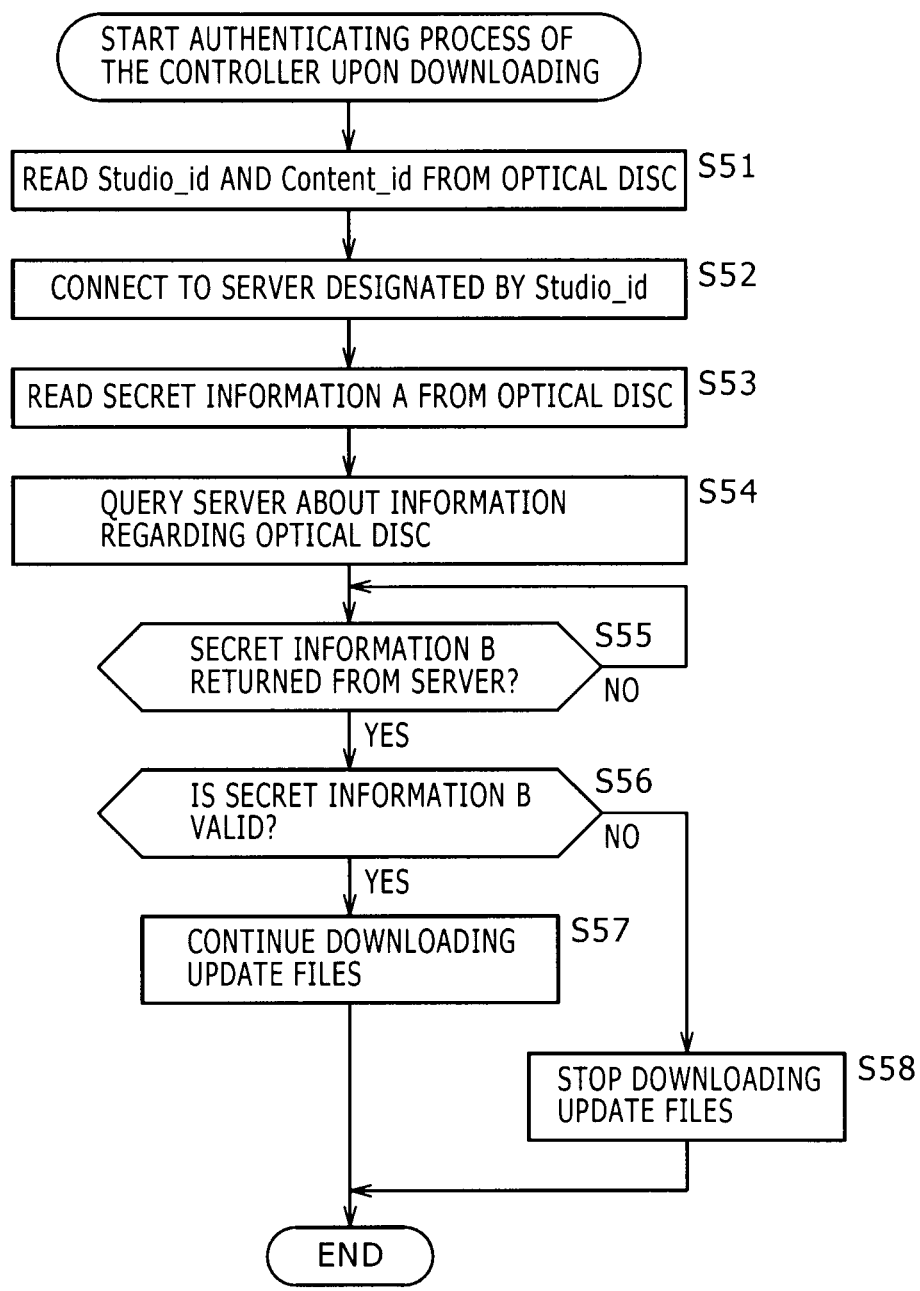
FIG. 17 is a flowchart of steps constituting a process performed by the player when it authenticates the server.

Described below with reference to the flowchart of FIG. 17 is a process performed by the player 1 in determining whether an accessed server from which to download applications is a legitimate server.

This process is carried out by the player 1 prior to the process explained above in reference to the flowchart of FIG. 13.

In step S51, the optical disc directory management section 33 of the controller 21 causes the optical disc drive 22 to read Studio_id and Content_id from the optical disc 11. The optical disc directory management section 33 outputs Studio_id and Content_id retrieved from the optical disc 11 to the communication control section 32.

In step S52, the communication control section 32 establishes connection with the server designated by Studio_id in the combination of Studio_id and Content_id supplied from the optical disc directory management section 33.

In step S53, the optical disc directory management section 33 reads secret information (called the secret information A hereunder with regard to the explanation of FIG. 17) from the optical disc 11. In step S54, the optical disc directory management section 33 queries the server about the information regarding the optical disc 11 (i.e., questions the server about the secret information A regarding the optical disc 11) through the communication control section 32.

In step S55, the optical disc directory management section 33 checks to determine whether the server has returned a response. The optical disc directory management section 33 waits until the server responds. In this example, the information to be returned from the server is called secret information B. The secret information B, when returned from the server, is sent to the optical disc directory management section 33 via the communication control section 32.

If in step S55 the server is found to have responded, the optical disc directory management section 33 goes to step S56. In step S56, the optical disc directory management section 33 checks to determine whether the secret information A retrieved in step S53 matches the secret information B returned from the server.

If in step S56 the secret information B from the server is found correct, step 57 is reached. In step S57, the optical disc directory management section 33 allows the communication control section 32 to continue downloading update files. If the secret information B is not found correct in step S56, then step S58 is reached. In step S58, the optical disc directory management section 33 causes the communication control section 32 to stop downloading the update files.

Thereafter, the process of FIG. 13 may or may not continue depending on the result of the check in step S56.

As described, questioning the server about secret information recorded on the optical disc 11 makes it possible for the player to download files only from the legitimate server.

Figure 18:
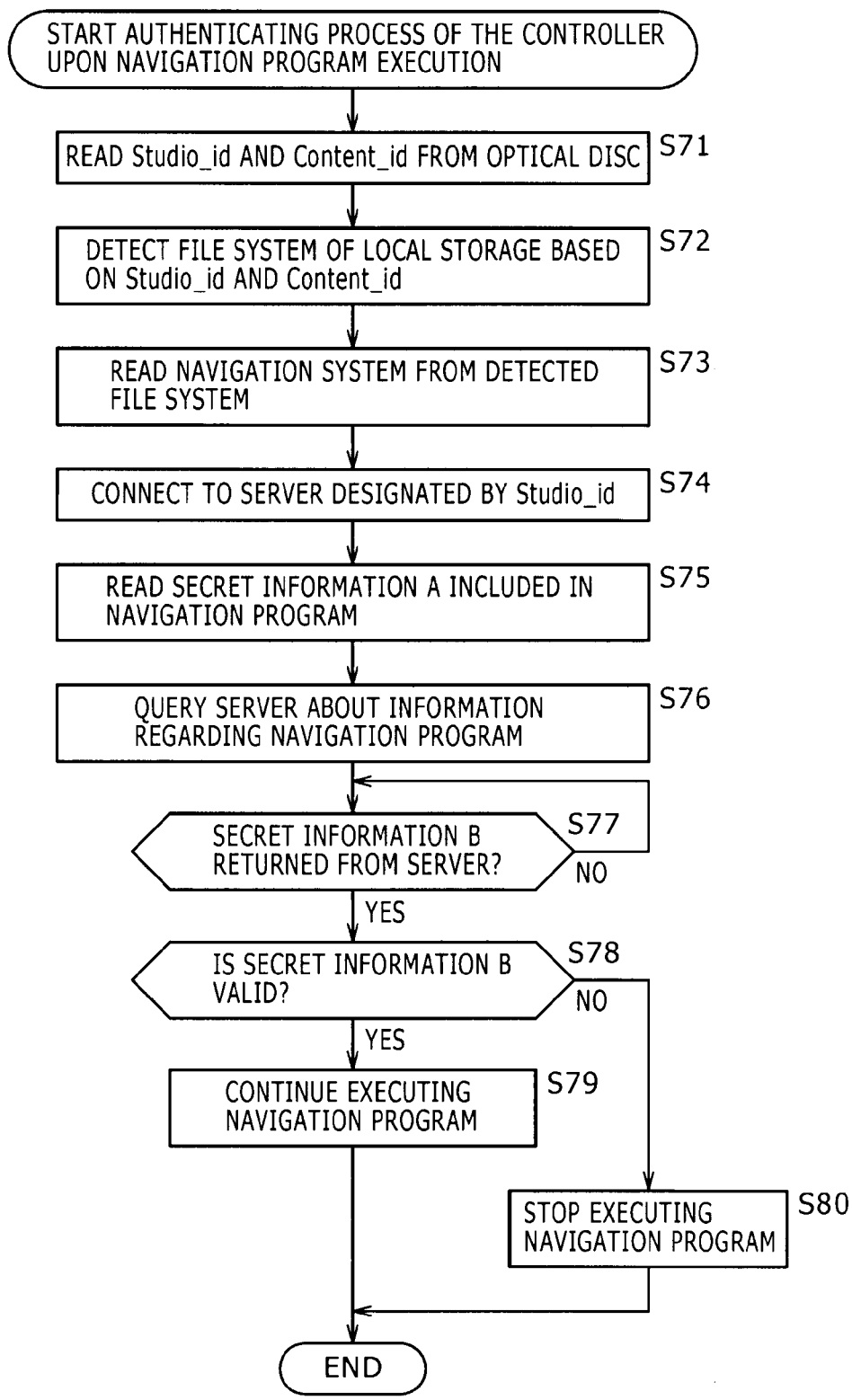
FIG. 18 is a flowchart of steps constituting another process performed by the player when it authenticates the server.

Described below with reference to the flowchart of FIG. 18 is a process performed by the player 1 in determining whether the navigation program held in the local storage 12 is a legitimate program at the time of its execution.

This process is carried out by the player 1 prior to the process explained above in reference to the flowchart of FIG. 15.

In step S71, the optical disc directory management section 33 of the controller 21 causes the optical disc drive 22 to read Studio_id and Content_id from the optical disc 11. The optical disc directory management section 33 outputs Studio_id and Content_id retrieved from the optical disc 11 to the communication control section 32 and local storage directory management section 34.

In step S72, the local storage directory management section 34 detects from the local storage 12 the content (i.e., file system of update files) corresponding to the content recorded on the optical disc 11 in accordance with Studio_id and Content_id fed from the optical disc directory management section 33.

In step S73, the local storage directory management section 34 reads the navigation program from the detected file system.

In step S74, the communication control section 32 establishes connection with the server designated by Studio_id supplied from the optical disc directory management section 33.

In step S75, the local storage directory management section 34 reads secret information (called the secret information A hereunder with regard to the explanation of FIG. 18) from the navigation program. In step S76, the local storage directory management section 34 queries the server about the information regarding the navigation program (i.e., questions the server about the secret information A as to the navigation program) via the communication control section 32. Illustratively, the secret information A is an electronic watermark added to the navigation program.

In step S77, the optical disc directory management section 33 checks to determine whether the server has returned a response. The optical disc directory management section 33 waits until the server responds. In this example, the information to be returned from the server is called secret information B. The secret information B, when returned from the server, is sent to the local storage directory management section 34 via the communication control section 32.

If in step S77 the server is found to have responded, the local storage directory management section 34 goes to step S78. In step S78, the local storage directory management section 34 checks to determine whether the secret information B is correct.

If in step S78 the secret information B returned from the server is found correct, step 79 is reached. In step S79, the local storage directory management section 34 allows the communication control section 32 to continue executing the navigation program. If the secret information B is not found correct in step S78, then step S80 is reached. In step S80, the local storage directory management section 34 causes the communication control section 32 to stop executing the navigation program.

Thereafter, the process of FIG. 15 may or may not continue depending on the result of the check in step S78.

As described, the navigation program is tested for validity prior to its execution. This process prevents an illicit navigation program from getting carried out.

When the server is authenticated by use of information recorded on the optical disc 11 or of information downloaded to the local storage 12 in the manner discussed above, there is no need to set up an authentication system involving a CA (certificate authority) generally employed to ascertain the validity of data. The cost that would be needed to build such an authentication system will thus be saved.

The series of steps or processes described above may be executed either by hardware or by software.

For the software-based processing to take place, the programs constituting the software may be either incorporated beforehand in dedicated hardware of a computer or installed upon use over a network or from a suitable recording medium into a general-purpose personal computer or like equipment capable of executing diverse functions based on the installed programs.

As shown in FIG. 11, the recording medium is offered to users not only as removable media 61 apart from their apparatuses and constituted by magnetic discs (including flexible discs), optical discs (including CD-ROM (compact disc-read only memory) and DVD), magneto-optical discs (including MD (Mini-disc: registered trademark)), or a semiconductor memory, each medium carrying the necessary programs; but also in the form of the ROM 52 or a hard disc drive making up the storage device 58, both accommodating the programs and incorporated beforehand in the apparatuses.

In this description, the steps which describe the programs to be executed and stored on the recording medium represent not only the processes that are to be carried out in the depicted sequence (i.e., on a time series basis) but also processes that may be performed parallelly or individually and not chronologically.

In this description, the term "system" refers to an entire configuration made up of a plurality of component devices.

The invention claimed is:

1. A reproducing apparatus comprising:
a readout section configured to read from a recording medium identification information about said recording medium which is removable and which stores a first AV stream and first control information for controlling reproduction of said AV stream, the first AV stream is stored as a first sub-folder in a first file system of said recording medium, and said first control information is recorded as a second sub-folder in the first file system of said recording medium;
a recording control section configured to acquire a second AV stream and second control information constituting an update of said first AV stream and said first control information from an information providing apparatus connected via a network, the acquisition being made in accordance with said identification information read out by said readout section, said recording control section further recording said second AV stream and said second control information to a recording section, said second AV stream being stored as a first sub-folder in a second file system of said recording section, and said second control information being recorded as a second sub-folder in the second file system of said recording section; and
a reproduction control section configured to control reproduction of said second AV stream based on said second control information recorded to said second file system of said recording section by said recording control section by merging the first and second file systems into a virtual file in which the second AV stream and second control information replace the first AV stream and first control information.

2. The reproducing apparatus according to claim 1, wherein said second control information includes information for designating reproduction segments of said first AV stream recorded on said recording medium, and information for designating reproduction segments of said second AV stream acquired from said information providing apparatus along with said second control information.

3. The reproducing apparatus according to claim 1, further comprising an authentication section configured to authenticate said information providing apparatus by querying said information providing apparatus about part of the information recorded on said recording medium.

4. The reproducing apparatus according to claim 1, further comprising an authentication section configured to authenticate said second control information by querying said information providing apparatus about part of said second control information.

* * * * *